(12) United States Patent
Baek et al.

(10) Patent No.: US 8,154,704 B2
(45) Date of Patent: Apr. 10, 2012

(54) LIQUID CRYSTAL DISPLAY AND METHOD FOR REPAIRING THE SAME

(75) Inventors: Myoung Kee Baek, Gyeonggi-do (KR); Kwang Ho Jang, Seoul (KR)

(73) Assignee: LG Display Co., Ltd., Seoul (KR)

( * ) Notice: Subject to any disclaimer, the term of this patent is extended or adjusted under 35 U.S.C. 154(b) by 789 days.

(21) Appl. No.: 12/314,511

(22) Filed: Dec. 11, 2008

(65) Prior Publication Data

US 2009/0295766 A1 Dec. 3, 2009

(30) Foreign Application Priority Data

May 28, 2008 (KR) .......................... 10-2008-0049657

(51) Int. Cl.
*G02F 1/13* (2006.01)
*G02F 1/1333* (2006.01)
*G02F 1/1345* (2006.01)

(52) U.S. Cl. ............................ 349/192; 349/54; 349/151
(58) Field of Classification Search ................ 349/54, 349/151, 192; 345/93, 204
See application file for complete search history.

(56) References Cited

U.S. PATENT DOCUMENTS 7,602,363 B2 * 10/2009 Kim et al. .................. 345/93
* cited by examiner

*Primary Examiner* — Nathanael R Briggs
(74) *Attorney, Agent, or Firm* — Morgan, Lewis & Bockius LLP

(57) ABSTRACT

A method for repairing a liquid crystal display. The method includes preparing a liquid crystal panel including a signal pad part and a repair pad part connected to signal lines; testing a driving circuit connected to the signal pad part on the liquid crystal panel; opening signal links connecting the signal lines and the signal pad part, connected to the driving circuit, if the driving circuit is detected in a defect as a result of the test; and mounting a repair driving circuit to be connected to the repair signal pad part on the liquid crystal panel.

14 Claims, 9 Drawing Sheets

LIQUID CRYSTAL DISPLAY AND METHOD FOR REPAIRING THE SAME

This application claims the benefit of Korean Patent Application No. 2008-049657, filed May 28, 2008, which is hereby incorporated by reference as if fully set forth herein.

BACKGROUND OF THE INVENTION

1. Field of the Invention

The present invention relates to a liquid crystal display, and more particularly, to a liquid crystal display and method for repairing the same, in which a defective gate driving integrated circuit is easily repaired without damage to a liquid crystal panel.

2. Discussion of the Related Art

As an information-oriented society has been developed, display devices have various shapes. In order to satisfy the above requirement, various flat panel display devices, including a liquid crystal display (LCD), a plasma display panel (PDP), an electro luminescent display (ELD), a vacuum fluorescent display (VFD), etc., have been researched, and some flat panel display devices have been used already as display devices in several apparatuses.

Among the above flat panel display devices, the LCD, which has advantages, such as an excellent image quality, a light weight, a thin profile, and a low power consumption, is being most widely used as a mobile image display device in place of a cathode ray tube (CRT). Further, in addition to the purpose of the mobile image display device, such as a monitor of a notebook computer, the LCD is variously developed and used as a television receiving a broadcast signal and displaying an image or a monitor of a computer.

FIG. 1 is a cross-sectional view of a liquid crystal display of the related art.

With reference to FIG. 1, the liquid crystal display (LCD) includes a liquid crystal panel, in which liquid crystal cells are arranged in a matrix, and driving integrated circuits 50 to drive the liquid crystal cells. The liquid crystal panel is produced by bonding a first substrate 10, on which a thin film transistor array is formed, and a second substrate, on which a color filter array is formed, through a cell process such that a liquid crystal layer is interposed between the first substrate 10 and the second substrate.

The first substrate 10 is a thin film transistor substrate, and includes a plurality of gate lines, a plurality of data lines intersecting with the plurality of gate lines such that a gate insulating film is formed between the plurality of gate lines and the plurality of data lines to define pixel regions, thin film transistors respectively formed at the intersections between the gate lines and the data lines, and pixel electrodes respectively formed at the pixel regions and connected to the thin film transistors.

The second substrate is a color filter substrate, and includes a black matrix layer to shield other regions except for the pixel regions from light, R, G, and B color filter layers to express colors, and common electrodes on the color filter layers.

The thin film transistor substrate and the color filter substrate are bonded to each other such that the liquid crystal layer is interposed between the two substrates.

The driving integrated circuits include a plurality of data driving integrated circuits to provide an pixel voltage signal to the data lines of the liquid crystal-panel, and a plurality of gate driving integrated circuits to provide a gate pulse to the gate lines of the liquid crystal panel.

Gate pads connected to the gate lines and data pads connected to the data lines are respectively connected to the gate driving integrated circuits and the data driving integrated circuit through an anisotropic conductive film (hereinafter, referred to as an ACF) 24. That is, the ACF 24 includes a thermosetting resin 24b and conductive balls 24a, and the ACF 24 electrically connects the gate pads and the data pads to the gate driving integrated circuits and the data driving integrated circuits respectively by thermocompression.

In case that the driving integrated circuits are bonded to the pads of the liquid crystal panel by the ACF 24, when the driving integrated circuit have a defect, the whole liquid crystal panel must be thrown away, thus causing the reduction of a yield and the increase of a manufacturing cost. Further, when the ACF 24 is cured once through heat, the ACF 24 becomes hard and is not easily detached from the pads and the driving integrated circuits, and may cause damage to the gate pads even if the ACF 24 is detached from the pads and the driving integrated circuits using heat and physical force. Moreover, the residual ACF 24 must be removed using chemical products even if a process for repairing the defective driving integrated circuit is carried out, and thus the process is complicated.

SUMMARY OF THE INVENTION

Accordingly, the present invention is directed to a liquid crystal display and method for repairing the same.

One object of the present invention is to provide a method for repairing a liquid crystal display, in which a defective gate driving integrated circuit is easily repaired without damage to a liquid crystal panel. To achieve this object and other advantages and in accordance with the purpose of the invention, as embodied and broadly described herein, a method for repairing a liquid crystal display includes preparing a liquid crystal panel including a signal pad part and a repair pad part connected to signal lines; testing a driving circuit connected to the signal pad part on the liquid crystal panel; opening signal links connecting the signal lines and the signal pad part, connected to the driving circuit, if the driving circuit is detected in a defect as a result of the test; and mounting a repair driving circuit to be connected to the repair signal pad part on the liquid crystal panel.

A liquid crystal display includes a liquid crystal panel including a signal pad part and a repair pad part connected to signal lines; a driving circuit connected to the signal pad part on the liquid crystal panel; and a repair driving circuit connected to the repair signal pad part on the liquid crystal panel, if the driving circuit is detected in a defect, wherein signal links connecting the signal lines and the signal pad part, connected to the defective driving circuit, is opened.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
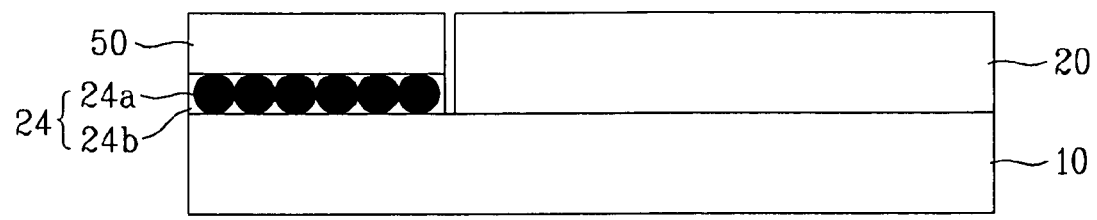
FIG. 1 is a cross-sectional view of a liquid crystal display of the related art.
Figure 2:
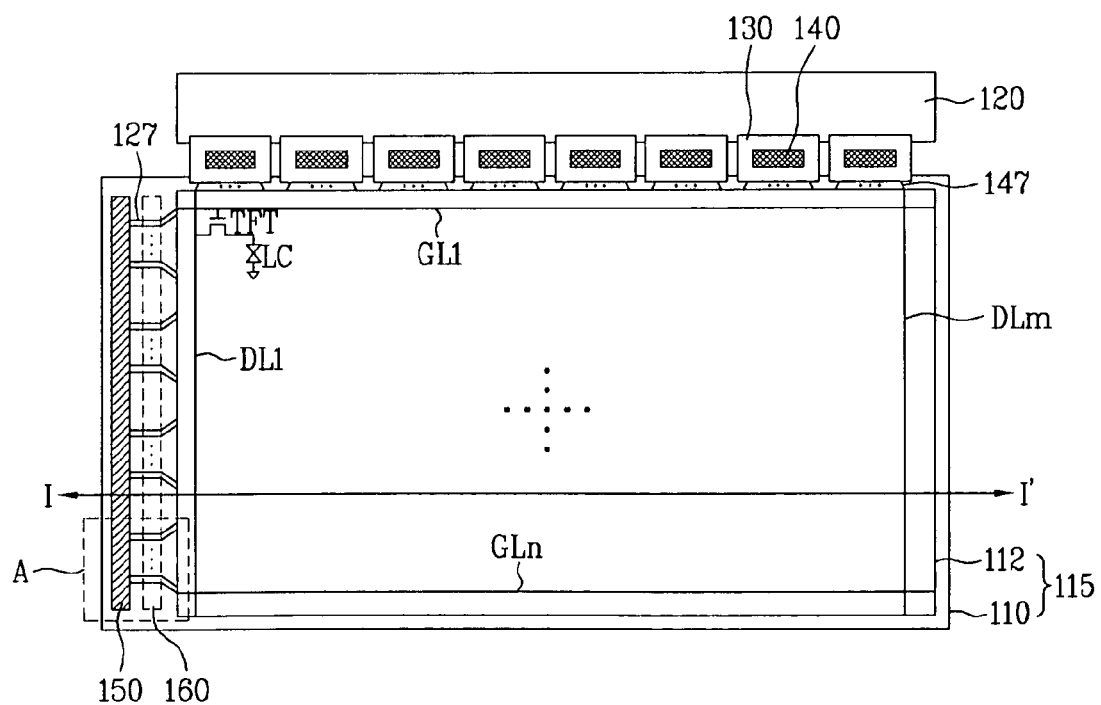
FIG. 2 is a plan view of a liquid crystal display in accordance with a first embodiment of the present invention.
Figure 3:
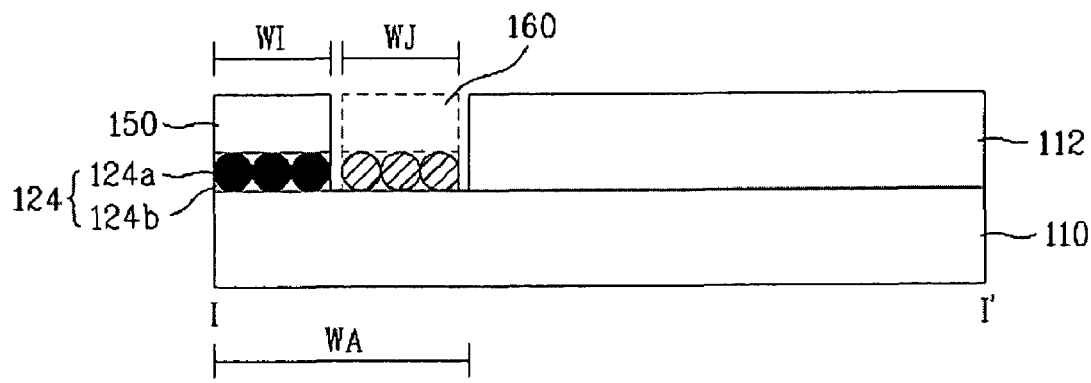
FIG. 3 is a cross-sectional view of the liquid crystal display, taken along the line I-I' of FIG. 2.

FIG. 2 is a plan view of a liquid crystal display in accordance with a first embodiment of the present invention, and FIG. 3 is a cross-sectional view of the liquid crystal display, taken along the line I-I' of FIG. 2.

With reference to FIGS. 2 and 3, the liquid crystal display in accordance with the first embodiment of the present invention includes a liquid crystal panel 115, on which liquid crystal cells LCs are arranged in a matrix, and driving circuits to drive the liquid crystal cells LCs. The liquid crystal panel 115 is produced by bonding a first substrate 110, on which a thin film transistor array is formed, and a second substrate 112, on which a color filter array is formed, through a cell process such that a liquid crystal layer is interposed between the first and second substrates 110 and 112.

The first substrate 110 is a thin film transistor substrate, and includes a plurality of gate lines GL1~GLn, a plurality of data lines DL1~DLm intersecting with the plurality of gate lines GL1~GLn such that a gate insulating film is formed between the gate lines GL1~GLn and the data lines DL1~DLm to define pixel regions, thin film transistors (hereinafter, referred to TFTs) respectively formed at the intersections between the gate lines GL1~GLn and the data lines DL1~DLm, and pixel electrodes respectively formed at the pixel regions and connected to the TFTs.

Each of the TFTs includes a gate electrode branched off from the gate line GL, the gate insulating film formed on the front surface of the substrate provided with the gate electrode, a semiconductor layer formed on the gate insulating film so as to be overlapped with the gate electrode, a source electrode branched off from the data line DL and formed on the semiconductor layer, and a drain electrode formed on the semiconductor layer so as to be opposite to the source electrode.

The thin film transistor substrate 110 and the second substrate 112, i.e., a color filter substrate, are bonded to each other such that the liquid crystal layer is interposed between the two substrates 110 and 112. The second substrate 112 includes a black matrix layer to shield other regions except for the pixel regions from light, R, G, and B color filter layers to express colors, and common electrodes on the color filter layers.

The driving circuits include a plurality of data driving integrated circuits 140 located at a region of the first substrate 110 exposed by the second substrate 112, i.e., at a non-display region, to provide an pixel voltage signal to the data lines DL1~DLm of the liquid crystal panel 115, and a gate driving circuits 150 located at the non-display region to provide a scan pulse to the gate lines. GL1~GLn of the liquid crystal panel 115.

The gate driving circuit 150 is mounted on the first substrate 110, in which driving integrated circuits are mounted on a circuit substrate using a thin film transistor of a poly silicon type by a low temperature poly silicon (LTPS) process. Further, the gate driving circuit 150 sequentially supplies a scan pulse to the gate lines GL1~GLn through a plurality of gate links 127, and sequentially drive the liquid crystal cells LCs on the liquid crystal panel 115 line by line.

The data driving integrated circuits 140 supply a pixel voltage signal to the respective data lines DL1~DLm whenever the scan pulse is supplied to any one of the gate lines GL1~GLn.

Gate pads connected to the gate lines GL1~GLn are connected to the gate driving circuit 150 through an ACF 124. That is, the ACF 124 includes conductive balls 124a and a thermosetting resin 124b, and electrically connects the gate pads and the gate driving circuit 150 by thermocompression.

Here, the gate driving circuit 150 is separated from a display region, and when the gate driving circuit 150 has a defect, a process for repairing the defective gate driving circuit 150 is required. Thus, after the defective gate driving circuit 150, a gate pad part connected to the defective gate driving circuit 150, and a region of the substrate 110 provided with the defective gate driving circuit 150 and the gate pad part connected to the defective gate driving circuit 150 are cut off by scribing using a wheel or the gate links 127 are opened using a laser, a repair gate driving circuit 160 is mounted on the substrate 110 between the defective gate driving circuit 160 and the display region, i.e., at the non-display region. The repair gate driving circuit 160 is connected to a repair gate pad part by the ACF 124, and the repair gate pad part are previously formed with the gate pads.

By the repair gate driving circuit 160 being mounted on the repair gate pad part and, as described above, the liquid crystal panel 115 has an increased width compared with the liquid crystal panel of the related art. However, since the repair gate pad part and the repair gate driving circuit 160 are mounted in a margin range of a backlight unit, the substantial size of a bezel is not increased. The width WA of the non-display region of the thin film transistor substrate 110 exposed by the color filter substrate 112 of the liquid crystal panel 115 is larger than the total sum of the width WI of the gate driving circuits 150 and the width WJ of the repair gate driving circuit 160.

The data driving integrated circuits 140 are respectively mounted on a plurality of tape carrier packages (hereinafter, referred to as TCPs) 130, and are connected between a printed circuit board 120 and the liquid crystal panel 115. The data driving integrated circuits 140 convert digital data signals into analog pixel voltage signals according to a data control signal, and supply the analog pixel voltage signals to the data lines DL1~DLm through a plurality of data links 147.

When the driving circuits bonded to the liquid crystal panel 115 using the ACF 124 has a defect, a process for the defective integrated circuit is required.

FIGS. 4A to 4C and FIGS. 5A to 5C are enlarged cross-sectional views of the region A of FIG. 2, illustrating a process for repairing the gate driving circuit 150.

Figure 4A:
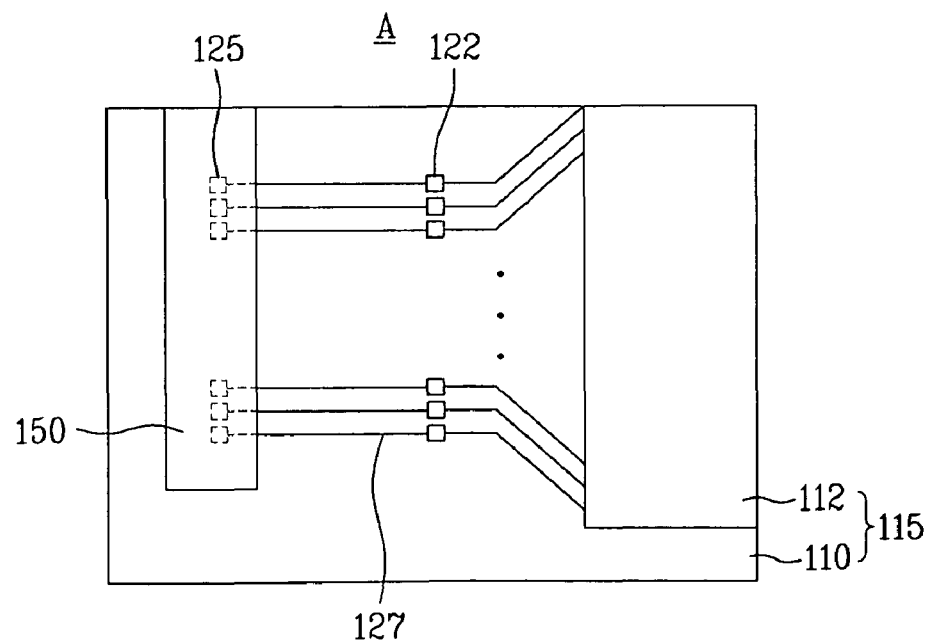
FIGS. 4A to 4C and FIGS. 5A to 5C are enlarged cross-sectional views of the region A of FIG. 2, illustrating a process for repairing a gate driving circuit.

As shown in FIG. 4A, the gate driving circuit 150 to sequentially supply a scan pulse to the gate lines through the plurality of gate links 127 is mounted on the non-display region of the first substrate 110 exposed by the second substrate 112.

When the gate driving circuit 150 of the finished liquid crystal display has a defect, as described above, the whole liquid crystal panel 115 must be thrown away, thus causing the reduction of a yield and the increase of a manufacturing cost. The gate driving circuit 150 is bonded to the gate pads 125 through thermocompression using the ACF including the conductive balls 124a and the thermosetting resin 124b. The ACF 124 becomes hard and is not easily detached from the gate pads 125 and the gate driving circuit when the ACF 124 is cured once through heat, and may cause damage to the gate pads 125 even if the ACF 124 is detached from the gate pads 125 and the gate driving circuit using heat and physical force. Further, the residual ACF must be removed using chemical products even if a process for repairing the defective gate driving circuit 150 is carried out and thus the process is complicated. Thus, an effective repairing process is required.

Figure 4B:
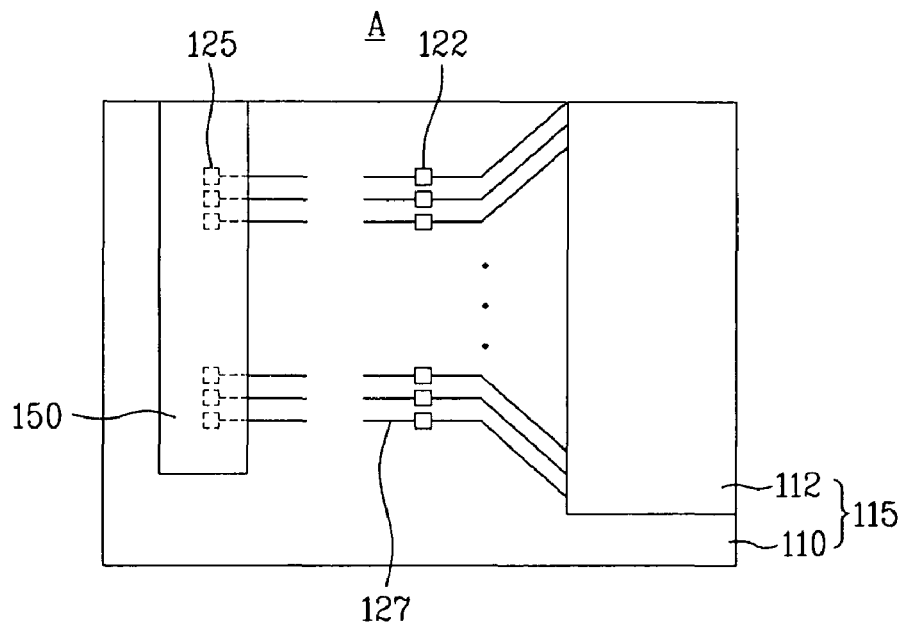
Figure 4C:
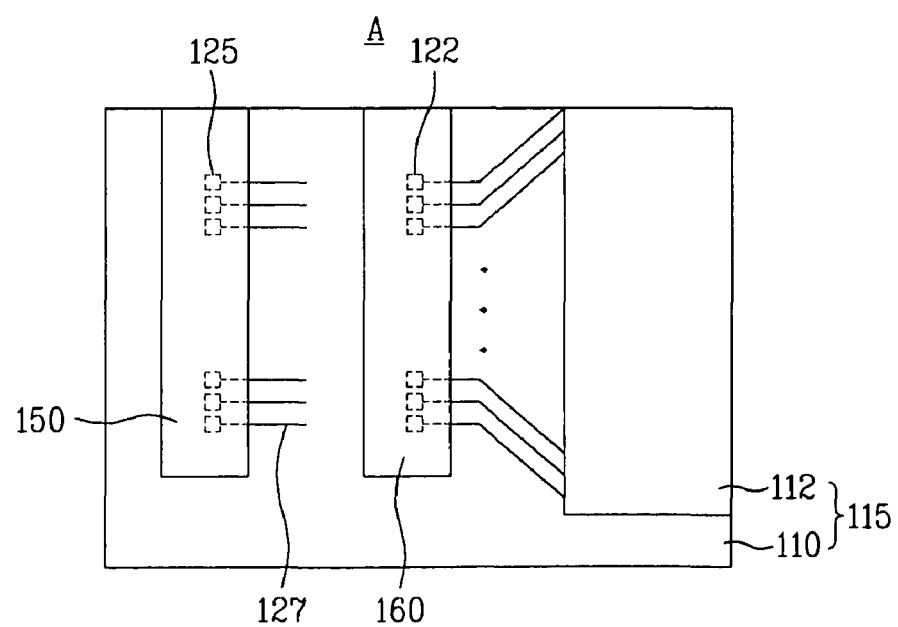

As shown in FIG. 4B, the gate links 127 between the gate pads 125 and the repair gate pads 122 are opened using a laser. Thereafter, as shown in FIG. 4C, the repair gate driving circuit 160 is connected to the repair gate pads 122 between the defective gate driving integrated circuit 150 and the display region through thermocompression using the ACF 124. The repair gate pads 122 are previously formed on gate links 127 with the gate pads 125 between the gate pads 125 and the gate lines.

By the repair gate driving integrated circuit 160 being mounted on the repair gate pads 122, as described above, the liquid crystal panel 115 has an increased width. However, since the repair gate driving circuit 160 are mounted in a margin range of a backlight unit, the substantial size of a bezel is not increased.

Figure 5A:
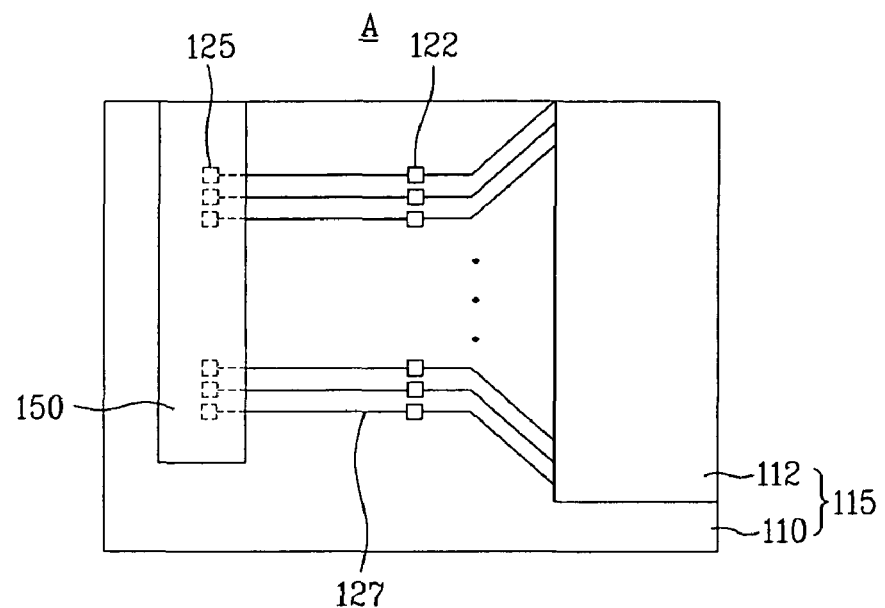
Figure 5B:
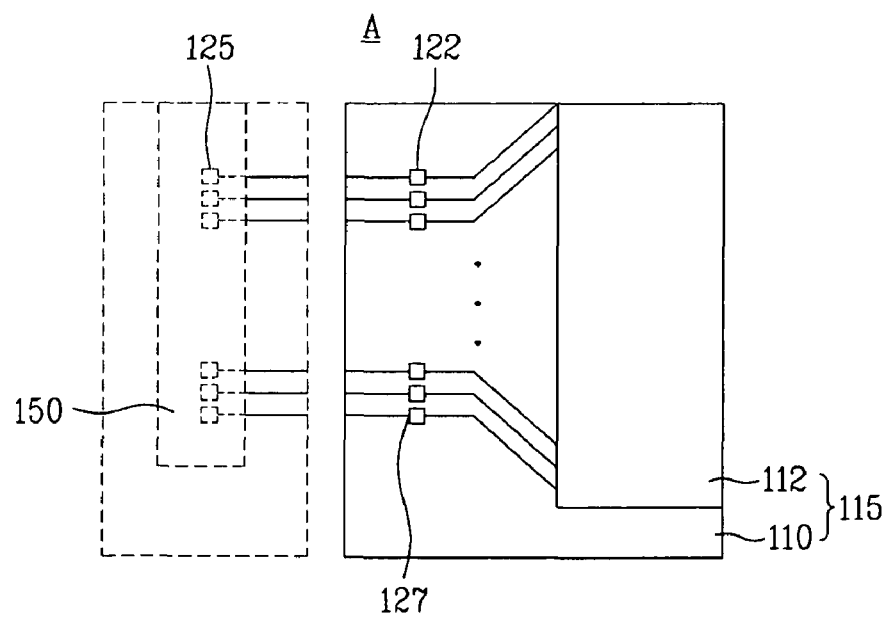
Figure 5C:
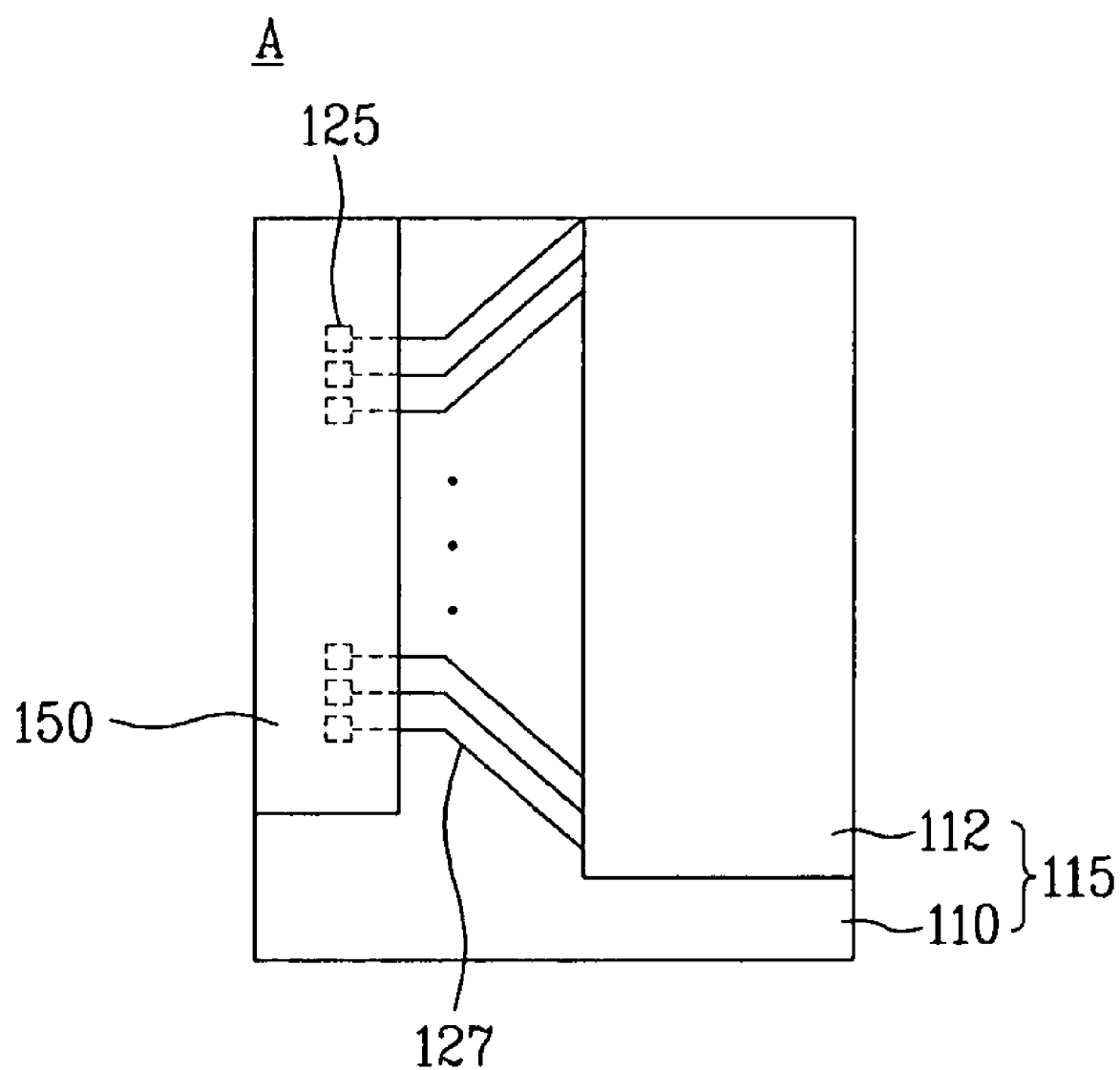

FIGS. 5A to 5C are enlarged cross-sectional views of the region A of FIG. 2, illustrating a process for repairing a gate driving circuit in accordance with another embodiment of the present invention.

As shown in FIGS. 5A to 5C, when the gate driving integrated circuit 150 of the finished liquid crystal display has a defect, a region of the substrate 110 provided with the defective gate integrated circuit 150 and the gate pads 125 connected to the defective gate driving circuit 150 is cut off by scribing, etc. Thereafter, a new repair gate driving circuit 160 is connected to repair gate pads 122 by thermocompression using the ACF 124.

The repair gate pads 122 are previously formed on gate links 127 with the gate pads 125 between the gate pads 125 and the gate lines.

By disconnecting or removing the defective gate driving circuit 150 and forming the new repair gate driving circuit 160, as described above, it is not necessary to apply heat or physical force to the liquid crystal panel 115 to detach the defective gate driving circuit 150 from the liquid crystal panel 115, and thus it is possible to prevent damage to the gate pads 125, thereby enhancing the yield of the liquid crystal display. Further, it is not necessary to remove the residual ACF 124 using chemical products, thus solving the complication of the process.

Figure 6:
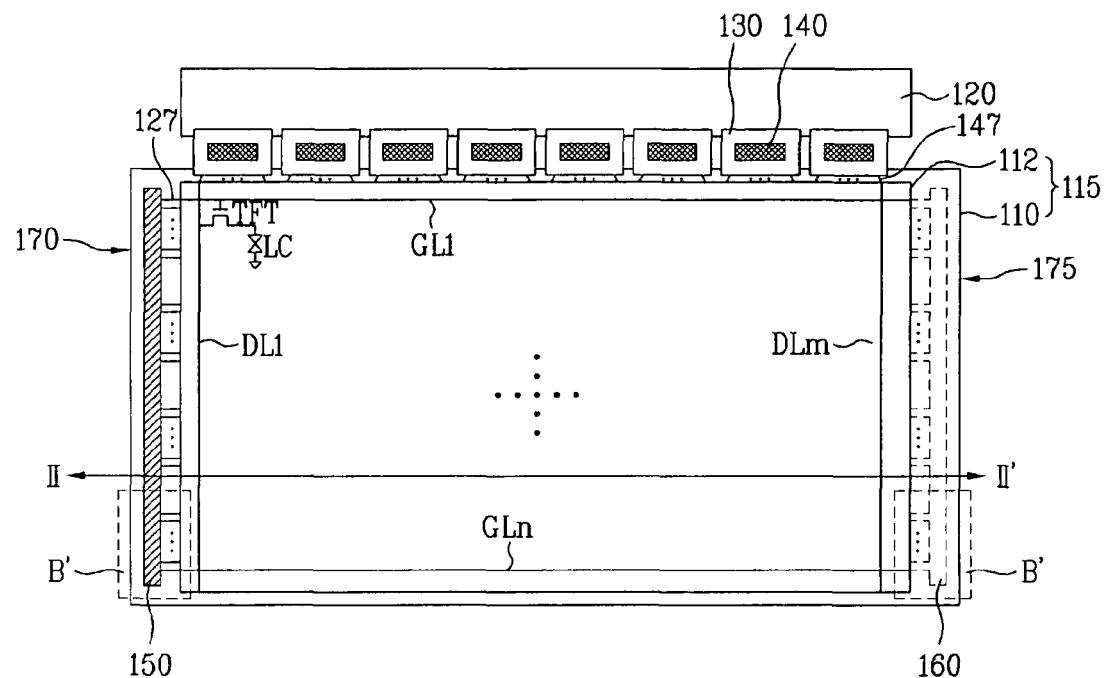
FIG. 6 is a plan view of a liquid crystal display in accordance with a second embodiment of the present invention.
Figure 7:
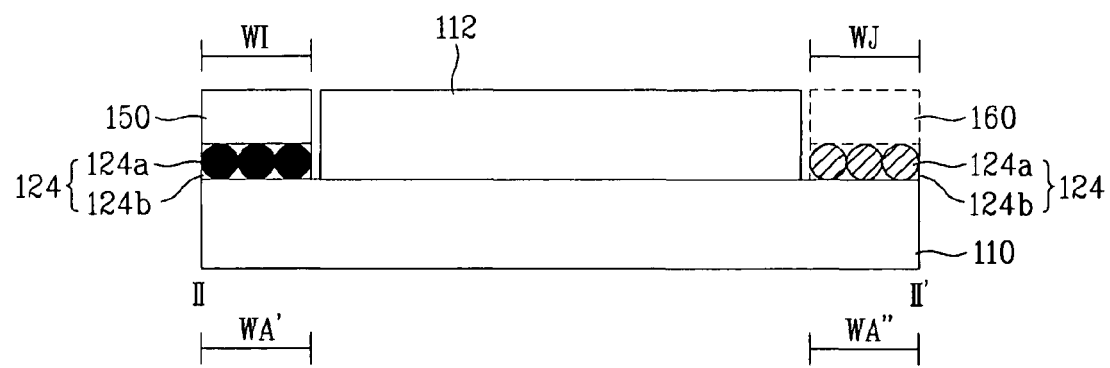
FIG. 7 is a cross-sectional view of the liquid crystal display, taken along the line II-II' of FIG. 6.

FIG. 6 is a plan view of a liquid crystal display in accordance with a second embodiment of the present invention, and FIG. 7 is a cross-sectional view of the liquid crystal display, taken along the line II-II' of FIG. 6.

With reference to FIGS. 6 and 7, the liquid crystal display in accordance with the second embodiment of the present invention includes a liquid crystal panel 115, on which liquid crystal cells LCs are arranged in a matrix, and driving circuits to drive the liquid crystal cells LCs. The liquid crystal panel 115 is produced by bonding a first substrate 110, on which a thin film transistor array is formed, and a second substrate 112, on which a color filter array is formed, through a cell process such that a liquid crystal layer is interposed between the first and second substrates 110 and 112.

The first substrate 110 is a thin film transistor substrate, and includes a plurality of gate lines GL1~GLn, a plurality of data lines DL1~DLm intersecting with the plurality of gate lines GL1~GLn such that a gate insulating film is formed between the gate lines GL1~GLn and the data lines DL1~DLm to define pixel regions, thin film transistors (hereinafter, referred to as TFTs) respectively formed at the intersections between the gate lines GL1~GLn and the data lines DL1~DLm, and pixel electrodes respectively formed at the pixel regions and connected to the TFTs.

Each of the TFTs includes a gate electrode branched off from the gate line GL, the gate insulating film formed on the front surface of the substrate provided with the gate electrode, a semiconductor layer formed on the gate insulating film so as to be overlapped with the gate electrode, a source electrode branched off from the data line DL and formed on the semiconductor layer, and a drain electrode formed on the semiconductor layer so as to be opposite to the source electrode.

The thin film transistor substrate 110 and the second substrate 112, i.e., a color filter substrate, are bonded to each other such that the liquid crystal layer is interposed between the two substrates 110 and 112. The second substrate 112 includes a black matrix layer to shield other regions except for the pixel regions from light, R, G, and B color filter layers to express colors, and common electrodes on the color filter layers.

The driving circuits include a plurality of data driving integrated circuits 140 located at the region of the first substrate 110 exposed by the second substrate 112, i.e., at a non-display region, to provide an pixel voltage signal to the data lines DL1~DLm of the liquid crystal panel 115, and a gate driving circuit 150 located at the non-display region to provide a gate pulse to the gate lines GL1~GLn of the liquid crystal panel 115. The gate driving circuit 150 is formed by a low temperature poly silicon (LTPS) process, in which the gate driving circuit 150 is formed on a circuit substrate using a thin film transistor of a poly silicon type.

The gate driving circuit 150 is mounted on the first substrate 110, sequentially supply a scan pulse to the gate lines GL1~GLn through a plurality of gate links 127, and thus sequentially drive the liquid crystal cells LCs on the liquid crystal panel 115 line by line. The data driving integrated circuits 140 supply a pixel voltage signal to the respective data lines DL1~DLm whenever the scan pulse is supplied to any one of the gate lines GL1~GLn.

Gate pads connected to the gate lines GL1~GLn are connected to the gate driving circuits 150 through an ACF 124. That is, the ACF 124 includes conductive balls 124a and a thermosetting resin 124b, and electrically connects the gate pads and the gate driving circuits 150 by thermocompression.

Here, the gate driving circuit 150 is formed at a first non-display region 170, and when the gate driving circuit 150 has a defect, a process for repairing the defective gate driving circuit 150 is required. Thus, the defective gate driving circuit 150, the gate pads connected to the defective gate driving circuit 150, and a region of the substrate 110 provided with the defective gate driving circuit 150 and the gate pads connected to the defective gate driving circuit 150 are cut off by scribing using a wheel or the gate links 127 are opened using a laser. Thereafter, a new repair gate driving circuit 160 is formed at a second non-display region 175 opposite to the defective gate driving circuit 150, and is connected to repair gate pads. The repair gate pads are previously formed on the second non-display region 175 with the gate pads on the first non-display region 170.

By the repair gate driving circuit 160 being mounted on the repair pads on the first substrate 110, as described above, the liquid crystal panel 115 has an increased width compared with the conventional liquid crystal panel. However, since the repair gate pads and the repair gate driving circuit 160 are mounted within a margin range of a backlight unit, the substantial size of a bezel is not increased. Further, the total sum of the widths WA' and WA" of the first and second non-display regions 170 and 175 of the thin film transistor substrate 110 exposed by the color filter substrate 112 of the liquid crystal panel 115 is larger than the total sum of the width WI of the gate driving circuit 150 and the width WJ of the repair gate driving circuit 160.

The data driving integrated circuits 140 are respectively mounted on a plurality of tape carrier packages (hereinafter, referred to as TCPs) 130, and are connected between a printed circuit board 120 and the liquid crystal panel 115. The data driving integrated circuits 140 convert digital data signal into analog pixel voltage signals according to a data control signal, and supply the analog pixel voltage signal to the data lines DL1~DLm through a plurality of data links 147.

FIGS. 8A to 8C and FIGS. 9A to 9C are enlarged cross-sectional views of the region B and the region B' of FIG. 7, illustrating a process for repairing a gate driving circuit.

Figure 8A:
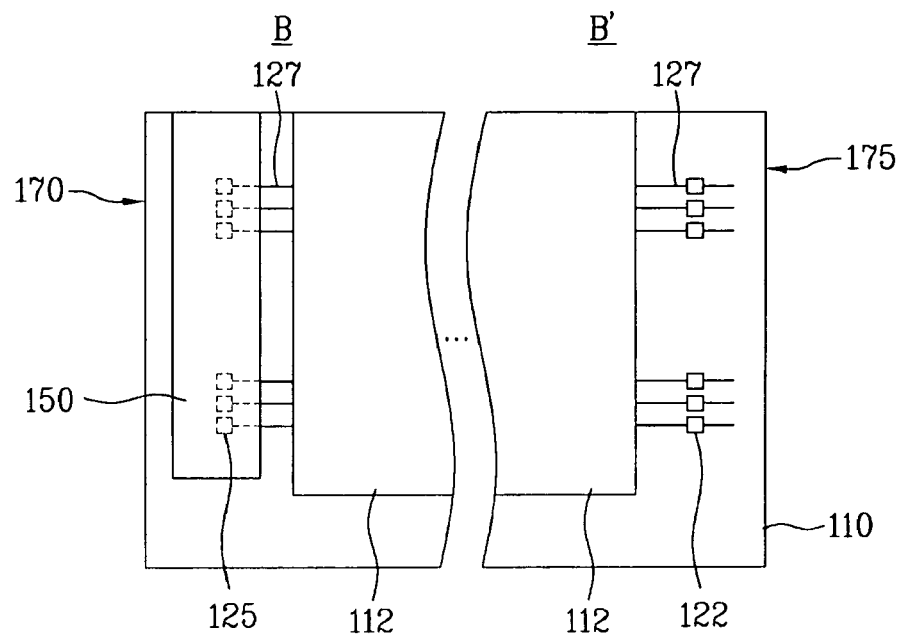
FIGS. 8A to 8C and FIGS. 9A to 9C are enlarged cross-sectional views of the region B and the region B' of FIG. 6, illustrating a process for repairing a gate driving circuit.
Figure 8B:
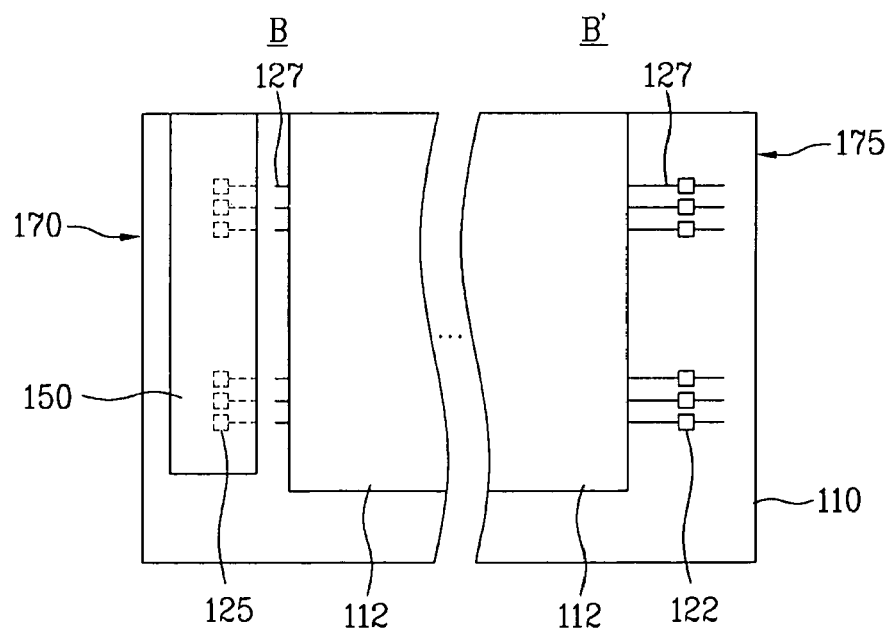
Figure 8C:
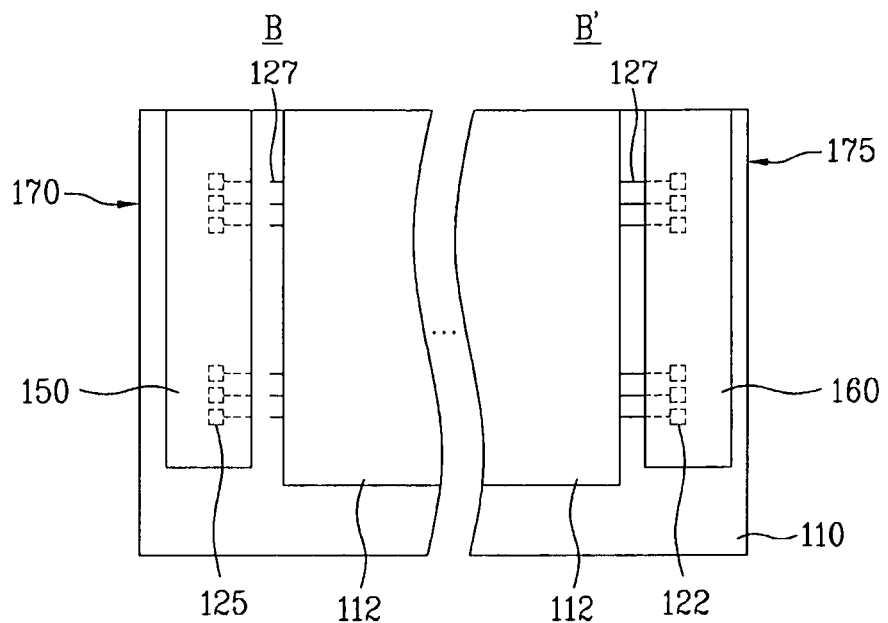

As shown in FIG. 8A, the gate driving circuit 150 to sequentially supply a scan pulse to the gate lines through the plurality of gate links 127 is mounted on the region of the first substrate 110 exposed by the second substrate 112, i.e., the first non-display region 170. Here, when the gate driving circuit 150 has a defect, the gate links 127 are opened using a laser, as shown in FIG. 8B. Thereafter, as shown in FIG. 8C, a new repair gate driving circuit 160 is mounted on a second non-display region 175 opposite to the defective gate driving circuit 150, and is connected to repair gate pads 122, formed in advance, by thermocompression using the ACF 124.

Here, the gate pads 125 are connected to one end of each of the gate lines, and the repair gate pads 122 are connected to the other end of each of the gate lines.

Figure 9A:
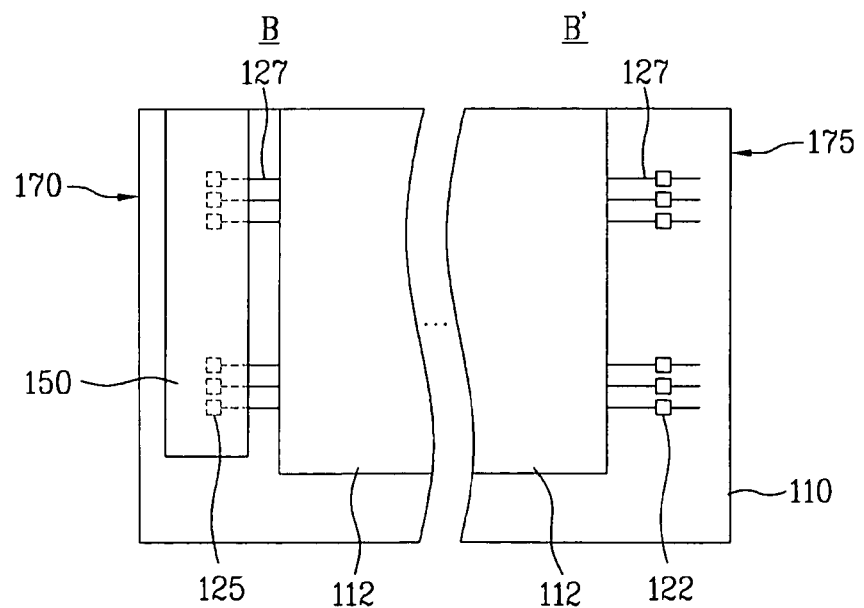
Figure 9B:
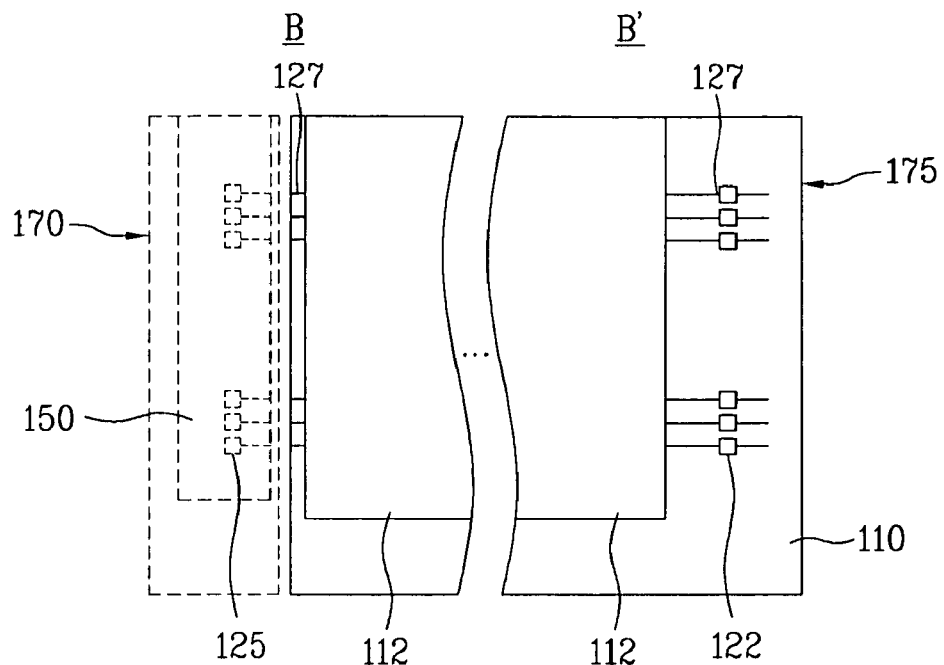
Figure 9C:
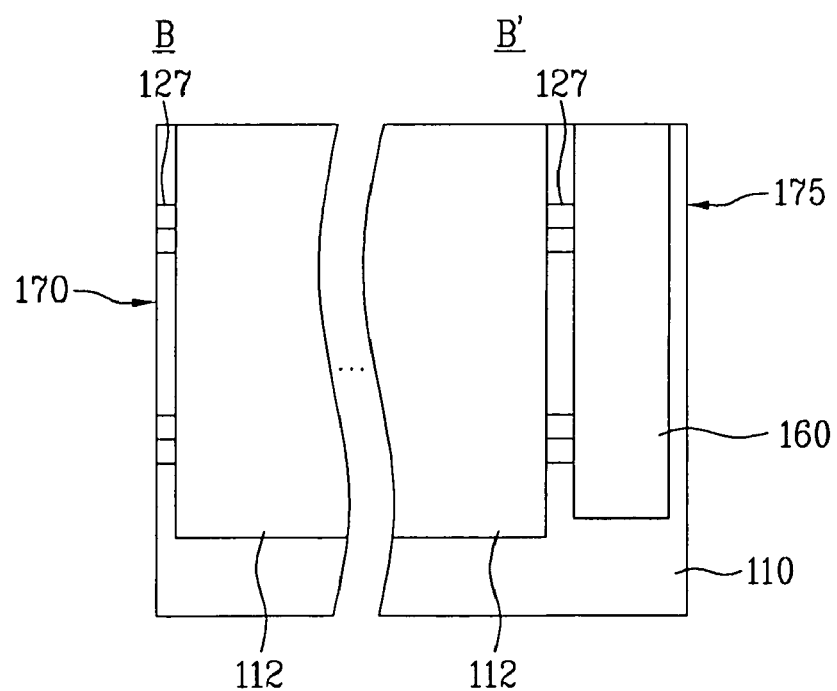

FIGS. 9A to 9C are enlarged cross-sectional views of the region B and the region B' of FIG. 6, illustrating a process for repairing a gate driving circuit in accordance with another embodiment of the present invention.

When the gate driving circuit 150 of the finished liquid crystal display has a defect, as shown in FIG. 9A, the first non-display region 170 of the first substrate 110 provided with the defective gate driving circuit 150 and the gate pads connected to the defective gate driving circuit 150 is cut off by scribing, as shown in FIG. 9B. Thereafter, a new repair gate driving circuit 160 is mounted on the second non-display region 175 opposite to the defective gate driving circuit 150, and is connected to the repair gate pads 122, formed in advance, by thermocompression using the ACF 124. Here, the gate pads 125 are connected to one end of each of the gate lines, and the repair gate pads 122 are connected to the other end of each of the gate lines.

By disconnecting or removing the defective gate driving circuit 150 and forming the new repair gate driving circuit 160, as described above, it is not necessary to apply heat or physical force to the liquid crystal panel 115 to detach the defective gate driving circuit 150 from the liquid crystal panel 115, and thus it is possible to prevent damage to the gate pads 125, thereby enhancing the yield of the liquid crystal display.

Further, it is not necessary to remove the residual ACF 124 using chemical products, thus solving the complication of the process.

Although the embodiments of the present invention describe the repairing method of repairing a gate driving circuit, the present invention may be applied to a repairing method of a data driving integrated circuit.

The liquid crystal display and method repairing the same of the present invention has several effects, as follows.

Since a defective gate driving circuit is disconnected or removed and a new repair gate driving circuit is formed, it is not necessary to apply heat or physical force to a liquid crystal panel to detach the defective gate driving circuit from the liquid crystal panel, and thus it is possible to prevent damage to gate pads, thereby enhancing the yield of the liquid crystal display. Further, it is not necessary to remove a residual ACF using chemical products, thus solving the complication of the process.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for repairing a liquid crystal display comprising:
   preparing a liquid crystal panel including a signal pad part and a repair pad part connected to signal lines;
   testing a driving circuit connected to the signal pad part on the liquid crystal panel;
   opening signal links connecting the signal lines and the signal pad part, connected to the driving circuit, if the driving circuit is detected in a defect as a result of the test; and
   mounting a repair driving circuit to be connected to the repair signal pad part on the liquid crystal panel.

2. The method according to claim 1, wherein the repair signal pad part is connected between the signal pad part and the signal lines.

3. The method according to claim 2, wherein in the opening of the signal links, the signal links connected to the defective driving circuit are opened by a laser, or the signal pad part mounted the defective driving circuit are removed by scribing.

4. The method according to claim 1, wherein the signal pad part is connected to one end of each of the signal lines, and the repair signal pad part is connected to the other end of each of the signal lines.

5. The method according to claim 4, wherein in the opening of the signal links, the signal links connected to the defective driving circuit are opened by a laser, or the signal pad part mounted the defective driving circuit are removed by scribing.

6. The method according to claim 1, wherein the width of a non-display region of a thin film transistor substrate exposed by a color filter substrate of the liquid crystal panel is larger than the total sum of the width of the driving circuit and the width of the repair driving circuit.

7. The method according to claim 1, wherein the driving circuit and the repair driving circuit are mounted on a circuit substrate using a thin film transistor of a poly silicon type using a low temperature poly silicon (LTPS) process.

8. A liquid crystal display comprising:
   a liquid crystal panel including a signal pad part and a repair pad part connected to signal lines;

a driving circuit connected to the signal pad part on the liquid crystal panel; and a repair driving circuit connected to the repair signal pad part on the liquid crystal panel, if the driving circuit is detected in a defect, wherein signal links connecting the signal lines and the signal pad part, connected to the defective driving circuit, is opened.

9. The display according to claim 8, wherein the repair signal pad part is connected between the signal pad part and the signal lines and the repair driving circuit is mounted on the repair pad part between the defective driving circuit and the signal lines.

10. The display according to claim 9, wherein the signal links connected to the defective driving circuit are opened by a laser, or the signal pad part mounted the defective driving circuit are removed by scribing.

11. The method according to claim 8, wherein the signal pad part and the defective driving circuit are formed on a first non-display region, and the repair signal pad part and the repair driving circuit are formed on a second non-display of the liquid crystal panel opposite to the first non-display region.

12. The display according to claim 11, wherein the signal links connected to the defective driving circuit are opened by a laser, or the signal pad part mounted the defective driving circuit are removed by scribing.

13. The method according to claim 8, wherein the width of a non-display region of a thin film transistor substrate exposed by a color filter substrate of the liquid crystal panel is larger than the total sum of the width of the driving circuit and the width of the repair driving circuit.

14. The method according to claim 8, wherein the driving circuit and the repair driving circuit are mounted on a circuit substrate using a thin film transistor of a poly silicon type using a low temperature poly silicon (LTPS) process.

* * * * *